(12) United States Patent
Yokota et al.

(10) Patent No.: US 9,533,442 B2
(45) Date of Patent: Jan. 3, 2017

(54) INJECTION MOLD AND METHOD OF PRODUCING MOLDED RESIN ARTICLE

(71) Applicant: Kojima Plastics Co., Ltd., Kariya (JP)

(72) Inventors: Makoto Yokota, Kariya (JP); Chihiro Hayashi, Kariya (JP); Kazuhiko Tajiri, Kariya (JP); Yusuke Hiroi, Kariya (JP)

(73) Assignee: Kojima Plastics Co., Ltd., Kariya (JP)

( * ) Notice: Subject to any disclaimer, the term of this patent is extended or adjusted under 35 U.S.C. 154(b) by 190 days.

(21) Appl. No.: 14/580,838

(22) Filed: Dec. 23, 2014

(65) Prior Publication Data

US 2016/0075064 A1 Mar. 17, 2016

Related U.S. Application Data

(63) Continuation of application No. PCT/JP2014/074295, filed on Sep. 12, 2014.

(51) Int. Cl.
*B29C 45/27* (2006.01)
*B29C 45/18* (2006.01)
*B29C 45/30* (2006.01)
*B29C 45/00* (2006.01)

(52) U.S. Cl.
CPC ........... *B29C 45/18* (2013.01); *B29C 45/0025* (2013.01); *B29C 45/2708* (2013.01); *B29C 45/30* (2013.01); *B29C 2045/2714* (2013.01)

(58) Field of Classification Search
CPC ............. B29C 45/2616; B29C 45/2628; B29C 2045/0049; B29C 2045/2714
See application file for complete search history.

(56) References Cited

U.S. PATENT DOCUMENTS 4,391,579 A * 7/1983 Morrison .............. B29C 45/263
425/548
2013/0337104 A1 12/2013 Vannarsdall

FOREIGN PATENT DOCUMENTS

| JP | 59-143622 A1 | 8/1984 |
| JP | 61-104330 A1 | 5/1986 |
| JP | 04-062126 A1 | 2/1992 |

(Continued)

OTHER PUBLICATIONS

International Search Report and Written Opinion (Application No. PCT/JP2014/074295) dated Dec. 2, 2014.

(Continued)

*Primary Examiner* — Jill Heitbrink
(74) *Attorney, Agent, or Firm* — Burr & Brown, PLLC

(57) ABSTRACT

Providing an injection mold used for producing a molded resin article which is free of a weld line, irrespective of an injection pressure of a molten resin. At least one protrusion is provided in a first region of a ring runner portion defined by an inner circumferential surface of a first communication hole extending toward a cavity and an outer circumferential surface of a pin member disposed coaxially within the first communication hole, such that the protrusion projects from either one of these surfaces and an end face of the protrusion is held in contact with the other of these surfaces. The first region is a half of a circumference of the ring runner portion and is opposite to a circumferential position at which the first communication hole and a second communication hole extending perpendicularly to the first communication hole communicate with each other, with respect to the pin member.

11 Claims, 10 Drawing Sheets

(56) References Cited

FOREIGN PATENT DOCUMENTS

| | | |
|---|---|---|
| JP | 06-055580 A1 | 3/1994 |
| JP | 11-105081 A1 | 4/1999 |
| JP | 2004-082489 A1 | 3/2004 |
| JP | 2008-149500 A1 | 7/2008 |
| JP | 2014-177040 A1 | 9/2014 |
| WO | 91/18727 * | 12/1991 |

OTHER PUBLICATIONS

Japanese Office Action (Application No. 2013-052686) dated Nov. 10, 2015.

* cited by examiner

INJECTION MOLD AND METHOD OF PRODUCING MOLDED RESIN ARTICLE

CROSS REFERENCE TO RELATED APPLICATION

This application is a continuation of the International Application No. PCT/JP2014/074295, filed on Sep. 12, 2014, the entirety of which is incorporated herein by reference.

BACKGROUND OF THE INVENTION

1. Field of the Invention

The present invention relates generally to an injection mold and a method of producing a molded resin article, and more particularly to an improvement of an injection mold suitably used for producing a molded resin article including a cylindrical portion or a deep hole portion by injection molding, and a method of advantageously producing such a molded resin article by injection molding.

2. Description of Related Art

As a method of producing a molded resin article, an injection molding method is known and used for producing various kinds of molded resin article. In production of the molded resin article by the injection molding method, there is used a so-called injection mold having a cavity for forming the molded resin article, a runner for introducing a molten resin injected from an injection machine into the cavity, and a gate for communication between the runner and the cavity. The quality of the molded resin article obtained as an end product is highly dependent on arrangement of the gate formed in the injection mold.

Namely, in the production of the molded resin article including a cylindrical portion or a deep hole portion, in a case where the gate is formed at a circumferential position of a cylindrical space of the cavity, which space gives a side wall of the cylindrical portion or the hole portion of the intended molded resin article, for example, the molten resin flowing through the gate into the cavity is circulated through the cylindrical space of the cavity in its opposite circumferential directions, whereby fronts of flows of the molten resin come together within the cavity. As a result, a weld line is likely to be formed in the side wall of the cylindrical portion or the hole portion of the obtained molded resin article, at the circumferential position where the fronts of the flows of the molten resin come together, whereby the molded resin article has a poor appearance.

Under the above-described circumstances, JP-A-59 (1984)-143622 discloses an injection mold which permits production of a cylindrical molded resin article by controlling the problem of the poor appearance of the molded resin article due to formation of the weld line or the like, for example. In this injection mold, the runner has: a first communication hole which extends toward the cavity and one of opposite ends of which communicates with the gate; and a second communication hole which communicates with (which is connected to) the other end of the first communication hole remote from the gate, and which extends in a direction perpendicular to the direction of extension of the first communication hole. Further, a pin member is disposed within the first communication hole, so as to be spaced apart from an inner circumferential surface of the first communication hole and to extend coaxially with the first communication hole, and such that a distal end portion of the pin member extends through the gate. Thus, a ring runner portion is defined by a cylindrical space between the inner circumferential surface of the first communication hole and an outer circumferential surface of the pin member, which surfaces are opposed to each other, and the gate takes the form of an annular ring gate. In the injection mold described above, the molten resin is introduced through the ring runner portion and through the ring gate into the cylindrical cavity, and flows into the cavity in its axial direction. Thus, this injection mold is intended to prevent fronts of flows of the molten resin from coming together within the cavity, and accordingly prevent formation of the weld line, which would otherwise be caused where the fronts of the flows of the molten resin come together.

However, the inventors of the present invention made various studies on the conventional injection mold constructed as described above, and found that the formation of the weld line in the molded resin article obtained as the end product cannot be sufficiently prevented by using the conventional injection mold.

Namely, in the conventional injection mold, the runner has: the ring runner portion which is defined by the space between the inner circumferential surface of the first communication hole and the outer circumferential surface of the pin member, and which extends toward the ring gate; and a straight runner portion defined by the second communication hole extending in the direction perpendicular to the direction of extension of the ring runner portion. Further, one of opposite ends of the straight runner portion, which is remote from the ring runner portion, communicates with a sprue. Therefore, in the conventional injection mold described above, when the molten resin, which has been injected from an injection machine and flowed through the sprue and the straight runner portion, flows into the ring runner portion at a circumferential position at which the straight runner portion and the ring runner portion communicate with each other, a pressing force generated by a pressure of the injected molten resin is applied to the pin member disposed within the ring runner portion, whereby the pin member is pressed away from the above-indicated circumferential position. At this time, in a case where the molten resin includes a glass fiber or the like and has a low degree of fluidity, the molten resin is injected from the injection machine at a particularly high pressure, so that the pin member is pressed by a high pressure of the injected molten resin, and an axis of the pin member within the ring runner portion may be displaced due to flexural deformation of the pin member, for example. In this case, an amount of flow of the molten resin through the ring runner portion in its axial direction (direction of its extension) toward the ring gate may be uneven in a circumferential direction of the ring runner portion, causing fronts of flows of the molten resin to come together within the cavity, and leading to formation of the weld line in the molded resin article obtained as the end product.

SUMMARY OF THE INVENTION

The present invention was made in view of the background art described above. Therefore, an object of the present invention is to provide an injection mold and a method of producing a molded resin article, which make it possible to more surely produce the molded resin article which is free of the weld line, irrespective of a pressure at which the molten resin is injected from the injection machine.

In order to achieve the above-described object, it is a principle of the present invention to provide an injection mold having a cavity for forming a molded resin article, a runner for introducing a molten resin injected from an injection machine into the cavity, and a gate for communication between the runner and the cavity, wherein the runner has: a first communication hole which extends toward the cavity and one of opposite ends of which communicates with the gate; and a second communication hole which communicates with the other end of the first communication hole remote from the gate, and which extends in a direction perpendicular to the direction of extension of the first communication hole, and a pin member is disposed within the first communication hole so as to be spaced apart from an inner circumferential surface of the first communication hole and to extend coaxially with the first communication hole, and such that a distal end portion of the pin member extends through the gate, whereby a ring runner portion is defined by a cylindrical space between the inner circumferential surface of the first communication hole and an outer circumferential surface of the pin member, which surfaces are opposed to each other, and the gate takes the form of an annular ring gate, the injection mold being characterized in that: at least one protrusion is provided in a first region of the ring runner portion, which first region is a half of a circumference of the ring runner portion and is opposite to a circumferential position of the ring runner portion, at which the first communication hole and the second communication hole communicate with each other, with respect to the pin member, the at least one protrusion projecting from either one of the inner circumferential surface of the first communication hole and the outer circumferential surface of the pin member, such that an end face of the at least one protrusion is held in contact with the other of the inner circumferential surface of the first communication hole and the outer circumferential surface of the pin member.

According to one preferable form of the invention, at least a part of the inner circumferential surface of the first communication hole and at least a part of the outer circumferential surface of the pin member are tapered such that an inside diameter of the first communication hole and an outside diameter of the pin member gradually decrease in an axial direction of the ring runner portion toward the ring gate, whereby the ring runner portion is defined by a tapered cylindrical space whose diameter gradually decreases in its axial direction toward the ring gate.

According to another preferable form of the invention, the at least one protrusion is provided at a circumferentially central position in the above-described first region of the ring runner portion.

According to a further preferable form of the invention, the at least one protrusion is provided in both of the above-described first region of the ring runner portion and a second region of the ring runner portion, which second region is the other half of the circumference of the ring runner portion and includes the above-described circumferential position of the ring runner portion, at which the first communication hole and the second communication hole communicate with each other.

According to a still further preferable form of the invention, a sum of a maximum circumferential length of the at least one protrusion provided in the above-described second region, in a circumferential direction of the ring runner portion, is larger than a sum of a maximum circumferential length of the at least one protrusion provided in the above-described first region, in the circumferential direction of the ring runner portion.

According to a further preferable form of the invention, a number of the at least one protrusion provided in the above-described second region is larger than a number of the at least one protrusion provided in the above-described first region.

According to a further preferable form of the invention, the at least one protrusion is configured such that its circumferential length in a circumferential direction of the ring runner portion gradually decreases in an axial direction of the ring runner portion toward the ring gate.

According to a further preferable form of the invention, the at least one protrusion provided in the above-described second region is configured such that its circumferential length in a circumferential direction of the ring runner portion gradually decreases in an axial direction of the ring runner portion toward the ring gate.

According to a further preferable form of the invention, the at least one protrusion has a curved side surface located on the side of the second communication hole in the axial direction of the ring runner portion, which side surface extends in the circumferential direction of the ring runner portion and is convexed toward the second communication hole.

According to a further preferable form of the invention, the at least one protrusion provided in the above-described second region has a curved side surface located on the side of the second communication hole in the axial direction of the ring runner portion, which side surface extends in the circumferential direction of the ring runner portion and is convexed toward the second communication hole.

In order to achieve the above-described object, it is the other principle of the present invention to provide a method of producing a molded resin article by using an injection mold having a cavity for forming the molded resin article, a runner for introducing a molten resin into the cavity, and a gate for communication between the runner and the cavity, wherein the runner has: a first communication hole which extends toward the cavity and one of opposite ends of which communicates with the gate; and a second communication hole which communicates with the other end of the first communication hole remote from the gate, and which extends in a direction perpendicular to the direction of extension of the first communication hole, and a pin member is disposed within the first communication hole so as to be spaced apart from an inner circumferential surface of the first communication hole and to extend coaxially with the first communication hole, and such that a distal end portion of the pin member extends through the gate, whereby a ring runner portion is defined by a cylindrical space between the inner circumferential surface of the first communication hole and an outer circumferential surface of the pin member, which surfaces are opposed to each other, and the gate takes the form of an annular ring gate, the molded resin article being produced by an injection molding operation wherein the molten resin is injected from an injection machine and introduced into the cavity through the runner and through the ring gate, to fill the cavity, the method being characterized in that: at least one protrusion is provided in a first region of the ring runner portion, which first region is a half of a circumference of the ring runner portion and is opposite to a circumferential position of the ring runner portion, at which the first communication hole and the second communication hole communicate with each other, with respect to the pin member, the at least one protrusion projecting from either one of the inner circumferential surface of the first communication hole and the outer circumferential surface of the pin member, such that an end face of the at least one protrusion is held in contact with the other of the inner circumferential surface of the first communication hole and the outer circumferential surface of the pin member.

In the injection mold according to the invention, the at least one protrusion is provided so as to close a part of the first region of the ring runner portion, which first region is opposite to the circumferential position of the ring runner portion, at which the first communication hole and the second communication hole communicate with each other, with respect to the pin member. Namely, the at least one protrusion is provided so as to close a space between the outer circumferential surface of the pin member and the inner circumferential surface of the first communication hole, which space is located in the above-described first region of the ring runner portion. Therefore, even where a molten resin, which has been injected from the injection machine at a high pressure and flowed through the second communication hole, flows into the ring runner portion at the circumferential position of the ring runner portion at which the first and second communication holes communicate with each other, and the pin member disposed within the ring runner portion is pressed away from the above-indicated circumferential position of the ring runner portion, by a large pressing force generated due to the high pressure of the injected molten resin, it is possible to effectively prevent flexural deformation of the pin member, which would otherwise result in displacement of the axis of the pin member within the ring runner portion. Accordingly, it is possible to advantageously prevent unevenness of an amount of flow of the molten resin through the ring runner portion in its axial direction toward the ring gate, in the circumferential direction of the ring runner portion, which unevenness would otherwise be caused due to the displacement of the axis of the pin member within the ring runner portion. As a result, it is possible to effectively prevent fronts of flows of the molten resin from coming together within the cavity to form a weld line in the molded resin article obtained as an end product.

Accordingly, by using the injection mold according to the invention, the molded resin article which is free of the weld line can be more surely produced, irrespective of the pressure at which the molten resin is injected from the injection machine.

The method of producing the molded resin article according to the invention makes it possible to achieve substantially the same operational and physical advantages as those described above with respect to the injection mold according to the invention.

DETAILED DESCRIPTION OF THE INVENTION

To clarify the invention more specifically, embodiments of the invention will be described in detail by reference to the drawings.

Figure 1:
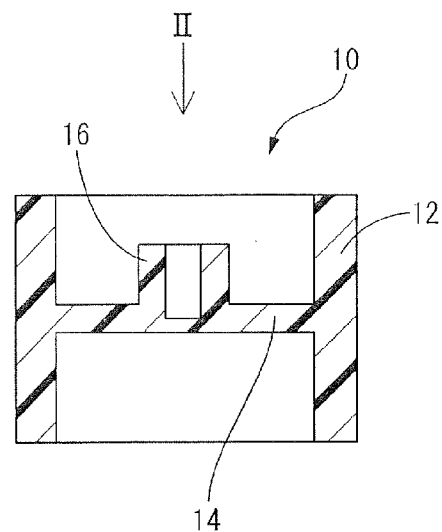
FIG. 1 is a schematic cross sectional view showing an example of a molded resin article produced by using an injection mold having a structure according to the invention.
Figure 2:
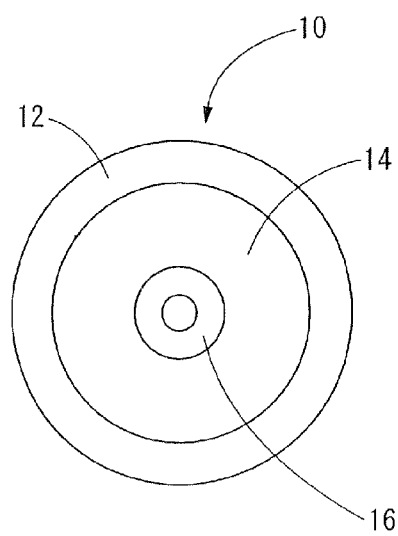
FIG. 2 is a schematic view taken in a direction of an arrow II in FIG. 1.

Referring first to the cross sectional view of FIG. 1 and the plan view of FIG. 2, there is shown an example of a molded resin article (product) 10 produced by injection molding using an injection mold having a structure according to the invention. As shown in FIGS. 1 and 2, the molded resin article 10 includes an outer cylindrical portion 12. In an axially middle part of an inner circumferential surface of the outer cylindrical portion 12, a partition wall 14 in the form of a disk is formed integrally with the outer cylindrical portion 12, whereby an inner bore of the outer cylindrical portion 12 is divided into two parts in its axial direction by the partition wall 14. Further, in a central part of one of opposite surfaces of the partition wall 14, an inner cylindrical portion 16 is formed integrally with the partition wall 14, such that the inner cylindrical portion 16 extends coaxially with the outer cylindrical portion 12 toward one of axially opposite open ends of the outer cylindrical portion 12. The inner cylindrical portion 16 has an outside diameter which is smaller than an inside diameter of the outer cylindrical portion 12, and an axial dimension which is smaller than a half of an axial dimension of the outer cylindrical portion 12. For the sake of convenience, one of opposite sides of the partition wall 14 of the molded resin article 10, on which the inner cylindrical portion 16 is formed, is hereinafter referred to as an upper side, while the other side of the partition wall 14 is referred to as a lower side.

The molded resin article 10 having the above-described structure is advantageously produced by injection molding using the injection mold having the structure according to the invention.

Figure 3:
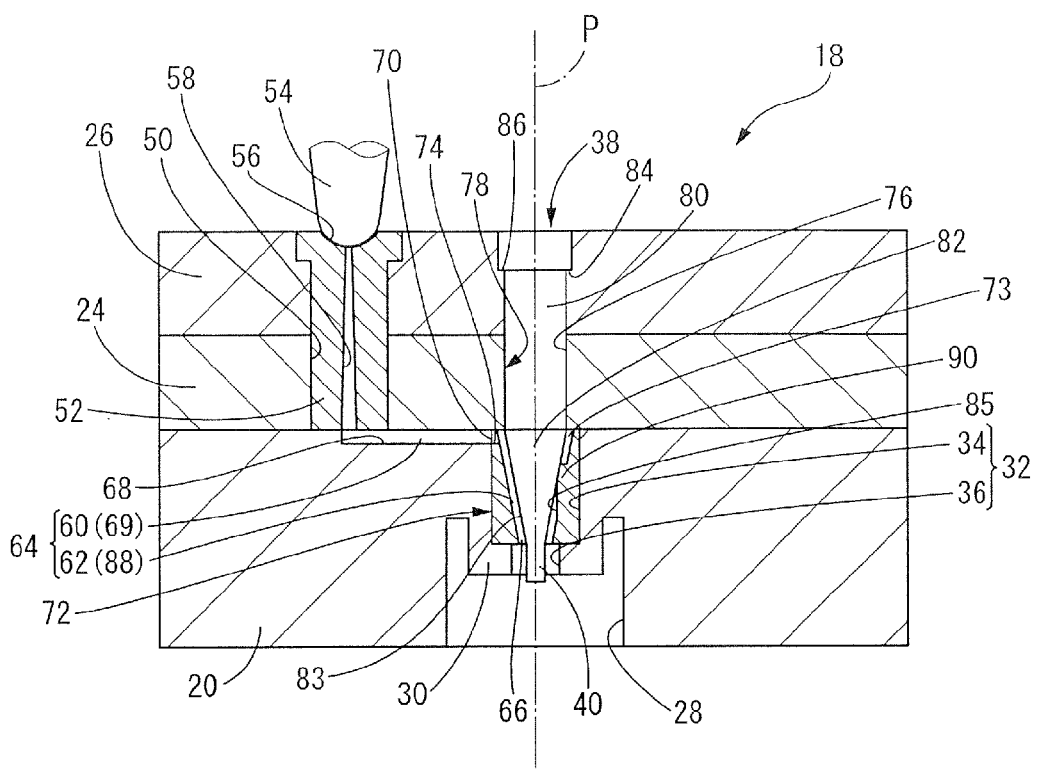
FIG. 3 is a schematic cross sectional view showing an open state of the injection mold having the structure according to one embodiment of the invention.
Figure 3:
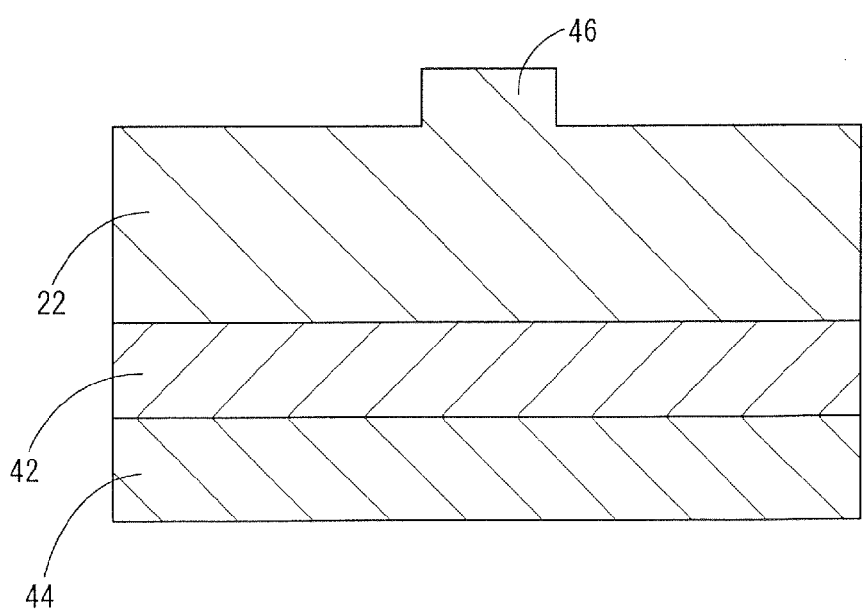
Figure 4:
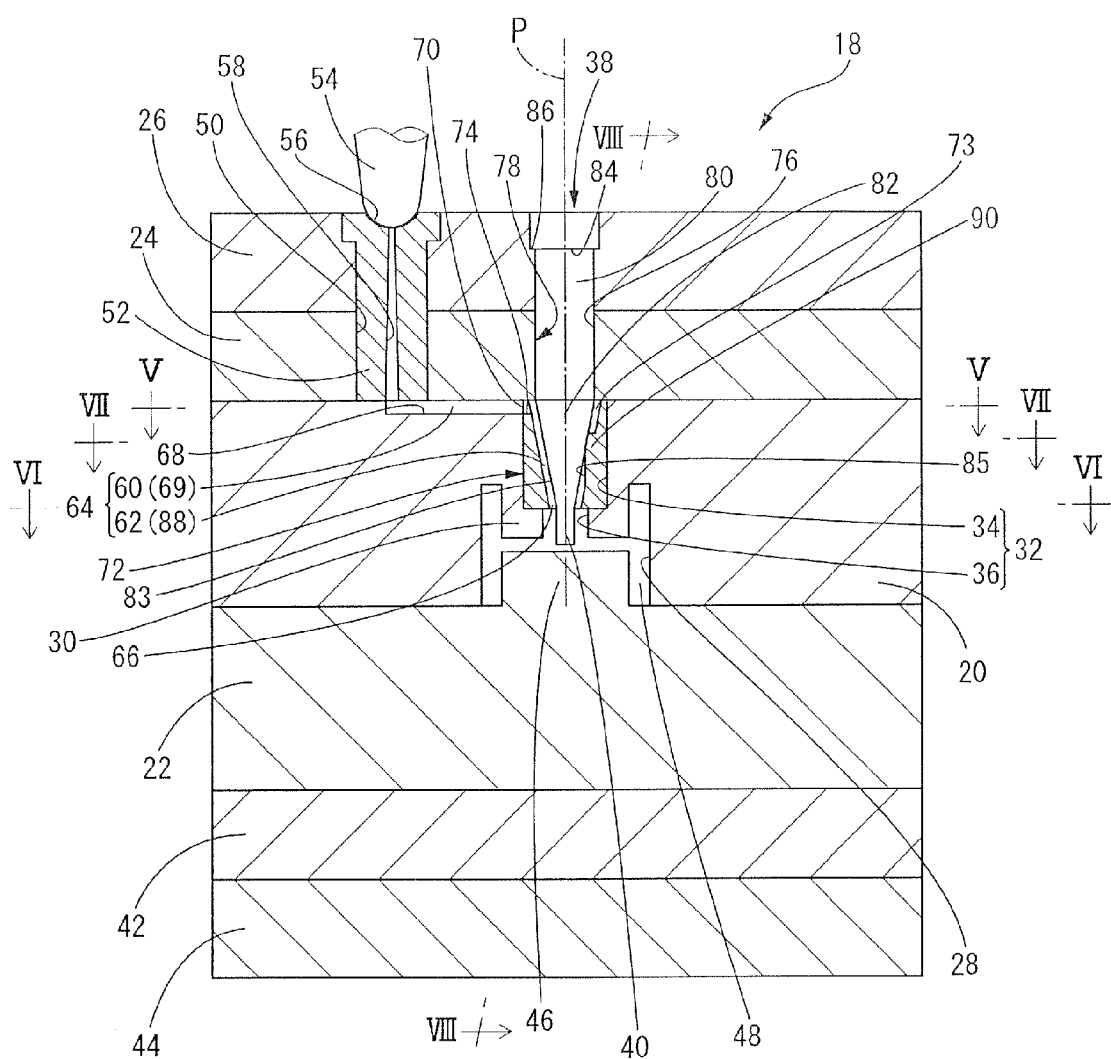
FIG. 4 is a schematic cross sectional view showing a closed state of the injection mold shown in FIG. 3.

An open state and a closed state of the injection mold 18 having the structure according to one embodiment of the invention and used for production of the molded resin article 10 are respectively shown in the longitudinal cross sectional views of FIGS. 3 and 4. As shown in FIGS. 3 and 4, the injection mold 18 of this embodiment includes a stationary mold member 20 and a movable mold member 22 disposed below the stationary mold member 20 so as to be opposed to the stationary mold member 20.

More specifically described, the stationary mold member 20 takes the form of a generally rectangular block. An upper surface of the stationary mold member 20, which surface is remote from the movable mold member 22, is attached to a stationary platen 26 fixed in place, via a stationary mold attachment plate 24, whereby the stationary mold member 20 is fixed above the movable mold member 22.

A cavity forming recess 28 is formed in a central part of a lower surface of the stationary mold member 20, which surface is opposed to the movable mold member 22. In a central part of a bottom surface of the cavity forming recess 28, a pillar protrusion 30 having a height smaller than a half of a depth of the cavity forming recess 28 is formed integrally with the bottom surface of the cavity forming recess 28. In a central part of the pillar protrusion 30, a first through hole 32 is formed so as to extend through the stationary mold member 20 in a vertical direction. The first through hole 32 has a stepped cylindrical inner circumferential surface whose upper portion has a larger diameter than its lower portion. Accordingly, an upper portion of the first through hole 32 defines a large-diameter portion 34 which is open in the upper surface of the stationary mold member 20, and a lower portion of the first through hole 32 defines a small-diameter portion 36 which is open in the cavity forming recess 28. A small-diameter distal end portion 40 of a core pin 38 extending through the large-diameter portion 34 of the first through hole 32 is disposed so as to extend through the small-diameter portion 36, as described later.

The cavity forming recess 28 has a cylindrical inner circumferential surface corresponding to an outer circumferential surface of the outer cylindrical portion 12 of the molded resin article 10. On the other hand, the pillar protrusion 30 has a cylindrical outer circumferential surface corresponding to a part of the inner circumferential surface of the outer cylindrical portion 12, which part is located on the upper side of the partition wall 14, and an annular end face corresponding to the upper surface of the partition wall 14. Further, the small-diameter portion 36 of the first through hole 32 has a cylindrical inner circumferential surface corresponding to an outer circumferential surface of the inner cylindrical portion 16 of the molded resin article 10, while the small-diameter distal end portion 40 of the core pin 38 disposed so as to extend through the small-diameter portion 36 has a cylindrical outer circumferential surface corresponding to an inner circumferential surface of the inner cylindrical portion 16. Thus, the cavity forming recess 28 including the small-diameter portion 36 of the first through hole 32 defines a shape corresponding to a shape formed by the outer circumferential surface of the intended molded resin article 10 and inner surfaces of a part of the molded resin article 10, which is located on the upper side of the partition wall 14.

On the other hand, the movable mold member 22 takes the form of a generally rectangular block, like the stationary mold member 20. A lower surface of the movable mold member 22, which surface is remote from the stationary mold member 20, is attached to a movable platen 44 via a movable mold attachment plate 42. A ram (not shown) of a hydraulic cylinder of a mold clamping device (not shown) is attached to a lower surface of the movable platen 44, and the movable platen 44 is movable upwards and downwards as the ram of the hydraulic cylinder is advanced and retracted. As the movable platen 44 is moved upwards and downwards, the movable mold member 22 is respectively moved toward and away from the stationary mold member 20 fixed above the movable mold member 22, such that the movable mold member 22 and the stationary mold member 20 are closed and opened.

In a central part of an upper surface of the movable mold member 22, which surface is opposed to the stationary mold member 20, a cavity forming protrusion 46 is formed integrally with the upper surface of the movable mold member 22. The cavity forming protrusion 46 has a circular end face corresponding to a lower surface of the partition wall 14 of the intended molded resin article 10, and a cylindrical outer circumferential surface corresponding to a part of the inner circumferential surface of the outer cylindrical portion 12, which part is located on the lower side of the partition wall 14. Thus, the cavity forming protrusion 46 has a contour corresponding to a shape formed by inner surfaces of a part of the molded resin article 10 (outer cylindrical portion 12), which is located on the lower side of the partition wall 14.

In a state where the movable mold member 22 and the stationary mold member 20 are closed as shown in FIG. 4, the cavity forming protrusion 46 of the movable mold member 22 is disposed within the cavity forming recess 28 of the stationary mold member 20, whereby a mold cavity 48 having a shape corresponding to that of the intended molded resin article 10 is formed between the movable mold member 22 and the stationary mold member 20.

Further, in the injection mold 18, a first insertion hole 50 is formed in one of longitudinally opposite end portions (left end portion as seen in FIG. 4) of the stationary platen 26 and the stationary mold attachment plate 24, so as to extend through the stationary platen 26 and the stationary mold attachment plate 24 in a direction of their thicknesses. A sprue bush 52 is disposed within the first insertion hole 50, and one of axially opposite end faces of the sprue bush 52 serves as a nozzle fitting surface 56 on which a distal end face of a nozzle 54 of an injection machine is fitted. A sprue 58 is formed so as to extend through the sprue bush 52 in its axial direction, and so as to be open in a central part of the nozzle fitting surface 56 of the sprue bush 52, whereby the sprue 58 can communicate with a hole in the nozzle 54 fitted on the nozzle fitting surface 56.

On the other hand, a runner 64 is formed in the stationary mold member 20, in order to introduce a molten resin injected from the nozzle 54 and flowing through the sprue 58, into the mold cavity 48 described above. The runner 64 has: a straight runner portion 60 communicating with the sprue 58 and extending straight in a horizontal direction; and a ring runner portion 62 defined by a cylindrical space communicating with the straight runner portion 60 and extending in the vertical direction. The ring runner portion 62 of the runner 64 communicates with the mold cavity 48 through an annular ring gate 66.

More specifically described, in the injection mold 18 of the present embodiment, the first through hole 32 is formed in a central portion of the stationary mold member 20, as described above. An upper open end of the large-diameter portion 34 of the first through hole 32 is open in the upper surface of the stationary mold member 20, while the small-diameter portion 36 of the first through hole 32 defines a part of the mold cavity 48. Namely, a lower open end of the large-diameter portion 34 (on the side of the small-diameter portion 36) communicates with the mold cavity 48.

Figure 5:
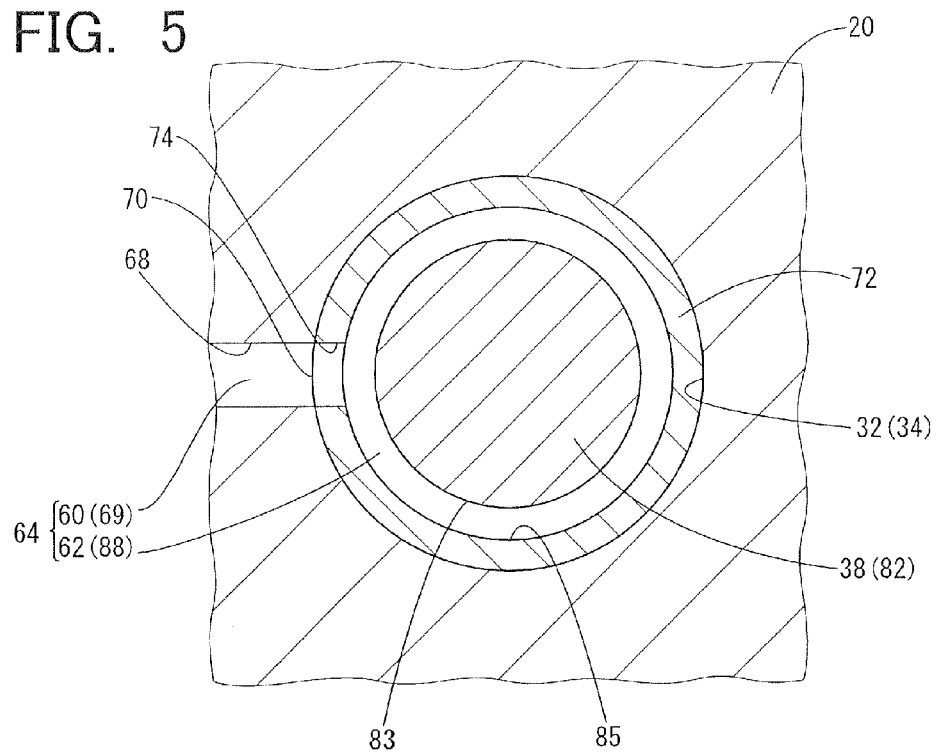
FIG. 5 is a fragmentary enlarged schematic cross sectional view taken along a line V-V in FIG. 4.

In the upper surface of the stationary mold member 20, a channel 68 having a rectangular cross sectional shape is formed so as to extend straight in the horizontal direction between one of longitudinally opposite end portions (left end portion as seen in FIG. 4) of the stationary mold member 20 and its central portion, as shown in FIGS. 4 and 5. An opening of the channel 68 in the upper surface of the stationary mold member 20 is closed by the stationary mold attachment plate 24. Thus, a transverse hole 69 defined by an inner space of the channel 68 extending in the horizontal direction and closed by the stationary mold attachment plate 24 is formed as a second communication hole in the stationary mold member 20.

One of opposite end portions of the transverse hole 69 in the direction of its extension communicates with the sprue 58 formed within the sprue bush 52, which end portion of the transverse hole 69 is located in the above-indicated one end portion of the stationary mold member 20, while the other end portion of the transverse hole 69 located in the central portion of the stationary mold member 20 serves as a communication opening 70 through which the transverse hole 69 communicates with the large-diameter portion 34 of the first through hole 32 communicating with the mold cavity 48.

Thus, the injection mold 18 of the present embodiment is configured such that the molten resin injected from the nozzle 54 of the injection machine and flowing through the sprue 58 is introduced into the transverse hole 69, and then guided through the transverse hole 69 in the horizontal direction toward the central portion of the stationary mold member 20. Accordingly, the transverse hole 69 in the present embodiment serves as the straight runner portion 60 which receives the molten resin flowing through the sprue 58, and guides the molten resin in the horizontal direction.

Further, a ring-runner-portion forming bush 72 is disposed within the large-diameter portion 34 of the first through hole 32, such that the ring-runner-portion forming bush 72 extends in the vertical direction and its outer circumferential surface is held in contact with the inner circumferential surface of the large-diameter portion 34. The ring-runner-portion forming bush 72 has an axial dimension which is substantially the same as an axial dimension of the large-diameter portion 34. The ring-runner-portion forming bush 72 has an inner bore 73 whose inner circumferential surface is tapered such that a diameter of the inner bore 73 gradually decreases in its axially downward direction. A relatively small lower open end of the inner bore 73 has a diameter which is smaller than a diameter of the small-diameter portion 36 of the first through hole 32, by a predetermined amount. Further, a notch 74 is formed at a circumferential position of an upper end face of the ring-runner-portion forming bush 72, whereby the inner bore 73 is open in a radially outward direction. The notch 74 has a rectangular shape having substantially the same size as that of the cross section of the above-described channel 68.

The ring-runner-portion forming bush 72 is disposed within the large-diameter portion 34, such that the notch 74 communicates with the communication opening 70 of the above-described transverse hole 69, and a lower end face of the ring-runner-portion forming bush 72 is held in contact with a surface of a shoulder formed in an axially intermediate part of the inner circumferential surface of the first through hole 32, at an interface between the large-diameter portion 34 and the small-diameter portion 36, while the upper end face of the ring-runner-portion forming bush 72 is held in contact with the stationary mold attachment plate 24.

Thus, in a state where an upper open end of the inner bore 73 of the ring-runner-portion forming bush 72 is closed by the stationary mold attachment plate 24, the inner bore 73 extending in the vertical direction perpendicular to the direction of extension of the transverse hole 69 communicates with the transverse hole 69 (straight runner portion 60) through the notch 74 and through the communication opening 70, and communicates with the mold cavity 48 through its lower open end. In the present embodiment, the inner bore 73 of the ring-runner-portion forming bush 72 serves as a first communication hole.

Further, a second through hole 76 is formed in central portions of the stationary mold attachment plate 24 and the stationary platen 26, so as to extend through the stationary mold attachment plate 24 and the stationary platen 26 in the direction of their thicknesses, as shown in FIG. 4. The second through hole 76 has a cylindrical inner circumferential surface whose diameter is smaller than a diameter of the relatively large upper open end of the ring-runner-portion forming bush 72 disposed within the large-diameter portion 34 of the first through hole 32, by a predetermined amount. The second through hole 76 communicates with the inner bore 73 of the ring-runner-portion forming bush 72, and is coaxial with the inner bore 73. Thus, the second through hole 76 and the inner bore 73 of the ring-runner-portion forming bush 72 extend in the vertical direction through the central portions of the stationary platen 26, the stationary mold attachment plate 24 and the stationary mold member 20, whereby a second insertion hole 78 extending through the central portions of the stationary platen 26, the stationary mold attachment plate 24 and the stationary mold member 20 is formed by the second through hole 76 and the inner bore 73 of the ring-runner-portion forming bush 72.

The core pin 38 serving as a pin member or a rod member is disposed so as to extend through the second insertion hole 78 in the vertical direction. The core pin 38 is formed from a round metal bar whose axial dimension is slightly larger than that of the second through hole 78. An upper end portion of the core pin 38 constitutes a large-diameter proximal end portion 80 in the form of a cylinder having a relatively large diameter, and a lower end portion of the core pin 38 constitutes the small-diameter distal end portion 40 in the form of a cylinder having a diameter which is considerably smaller than that of the large-diameter proximal end portion 80, while an intermediate portion of the core pin 38 located between its upper and lower end portions constitutes a tapered intermediate portion 82 whose diameter gradually decreases in a direction from the large-diameter proximal end portion 80 toward the small-diameter distal end portion 40, namely, in its axially downward direction. A taper angle of the tapered intermediate portion 82 is substantially the same as that of the inner circumferential surface 85 of the inner bore 73 of the ring-runner-portion forming bush 72. One of opposite ends of the tapered intermediate portion 82 on the side of the small-diameter distal end portion 40 has an outside diameter which is smaller than the inside diameter of the relatively small lower open end of the inner bore 73 defined by the inner circumferential surface 85 of the ring-runner-portion forming bush 72, by a predetermined amount. On the other hand, the other end of the tapered intermediate portion 82 on the side of the large-diameter proximal end portion 80 has an outside diameter which is smaller than an inside diameter of the relatively large upper open end of the inner bore 73 defined by the inner circumferential surface 85 of the ring-runner-portion forming bush 72, by a predetermined amount.

In a state where the core pin 38 is disposed within the second insertion hole 78, an outer circumferential surface 83 of the large-diameter proximal end portion 80 of the core pin 38 is held in contact with an inner circumferential surface of the second through hole 76. Further, the tapered intermediate portion 82 of the core pin 38 is disposed within the inner bore 73 of the ring-runner-portion forming bush 72, so as to be coaxial with the inner bore 73, and such that the outer circumferential surface 83 of the tapered intermediate portion 82 is spaced apart from the inner circumferential surface 85 of the ring-runner-portion forming bush 72, by a predetermined distance. Further, the small-diameter distal end portion 40 of the core pin 38 is disposed within the small-diameter portion 36 of the first through hole 32, so as to be coaxial with the small-diameter portion 36, and such that the outer circumferential surface 83 of the small-diameter distal end portion 40 is spaced apart from the inner circumferential surface of the small-diameter portion 36, by a predetermined distance. In this respect, it is noted that a shoulder 84 is formed in an axially intermediate part of the outer circumferential surface 83 of the large-diameter proximal end portion 80, so that an upper portion of the large-diameter proximal end portion 80 has a larger diameter than its lower portion. The shoulder 84 is held in engagement with an annular engagement surface 86 formed in the inner circumferential surface of the second through hole 76, whereby the core pin 38 is fixedly positioned within the second through hole 78.

Thus, a tapered cylindrical space 88 which extends in the vertical direction and whose diameter gradually decreases in its axially downward direction is formed between the outer circumferential surface 83 of the tapered intermediate portion 82 of the core pin 38 and the inner circumferential surface 85 of the ring-runner-portion forming bush 72, as shown in FIGS. 4 and 5. An upper portion of the tapered cylindrical space 88 communicates with the straight runner portion 60 through the above-described notch 74 and communication opening 70, while a lower open end of the tapered cylindrical space 88, which has a relatively small diameter, communicates with the mold cavity 48. Thus, the tapered cylindrical space 88 extending in the vertical direction serves as the ring runner portion 62 which communicates with the straight runner portion 60 and the mold cavity 48, receives the molten resin flowing through the straight runner portion 60 and guides the molten resin into the mold cavity 48.

Figure 6:
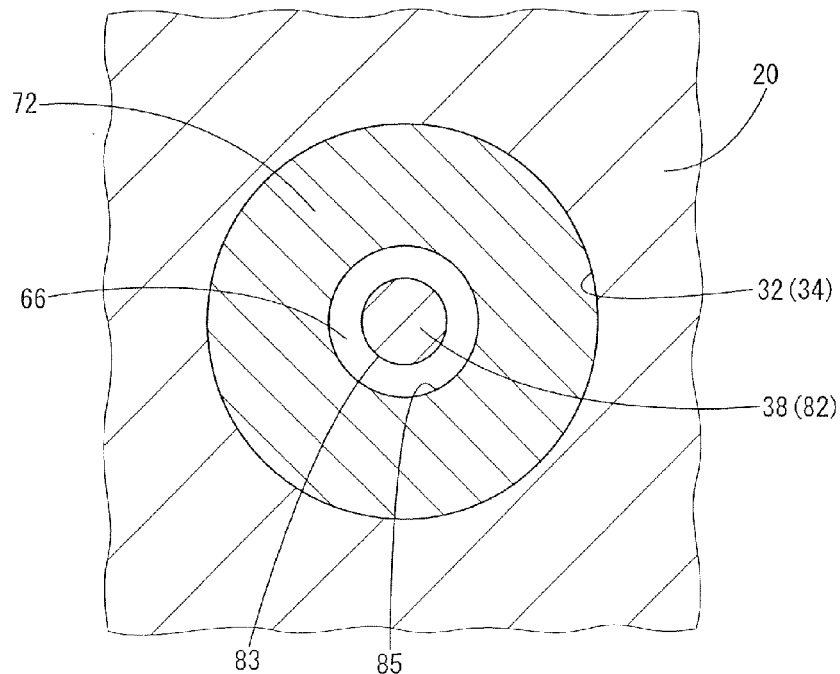
FIG. 6 is a fragmentary enlarged schematic cross sectional view taken along a line VI-VI in FIG. 4.

The lower open end of the ring runner portion 62, which has the relatively small diameter, serves as the annular ring gate 66 formed between a lower end of the outer circumferential surface 83 of the tapered intermediate portion 82 of the core pin 38 and a lower end of the inner circumferential surface 85 of the ring-runner-portion forming bush 72, as shown in FIGS. 4 and 6. Thus, the molten resin downwardly flowing through the ring runner portion 62 is introduced through the ring gate 66 into the mold cavity 48.

Figure 7:
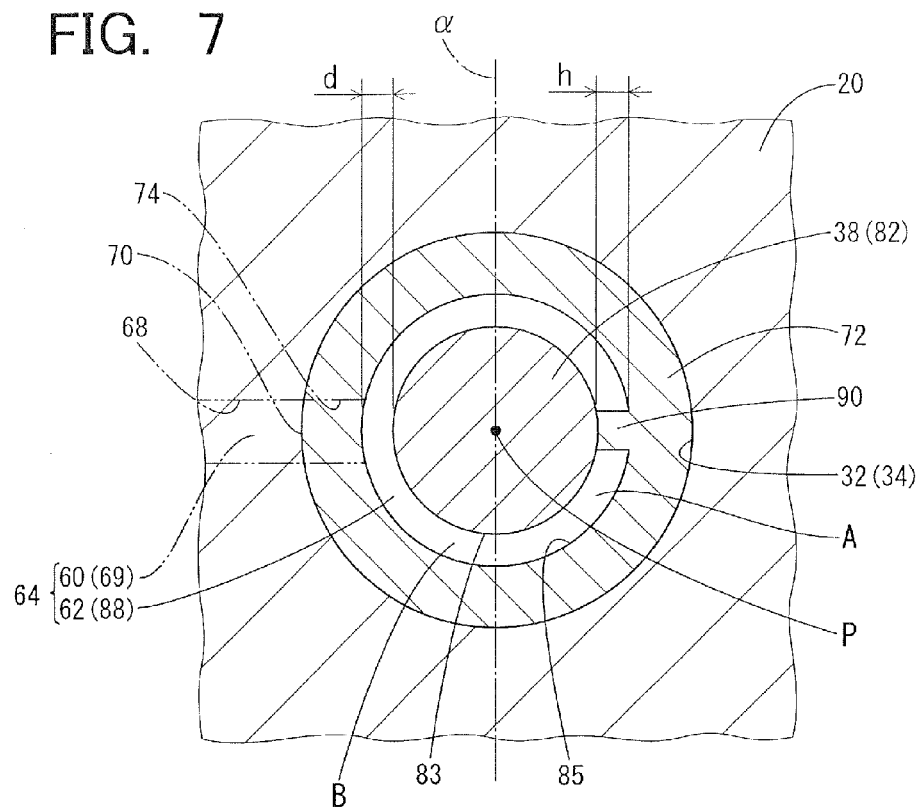
FIG. 7 is a fragmentary enlarged schematic cross sectional view taken along a line VII-VII in FIG. 4.

In the injection mold 18 of the present embodiment, one protrusion 90 is integrally formed on an axially intermediate part of the inner circumferential surface 85 of the ring-runner-portion forming bush 72, such that the protrusion 90 is located in a half of the circumference of the inner circumferential surface 85 of the ring-runner-portion forming bush 72, which half is opposite to the communication opening 70 provided for communication between the straight runner portion 60 and the ring runner portion 62, with respect to an axis P of the tapered intermediate portion 82 (core pin 38), as shown in FIGS. 4 and 7. Accordingly, the protrusion 90 is located in a first region A which is a half of the circumference of the ring runner portion 62, and which is opposite to the communication opening 70 with respect to the axis P of the tapered intermediate portion 82. In other words, the protrusion 90 is located in the first region A of the ring runner portion 62 (tapered cylindrical space 88), which is opposite to the other half of the circumference of the ring runner portion 62 adjacent to the straight runner portion 60, with respect to an imaginary reference plane a (shown by one-dot chain line in FIG. 7) which extends through the axis P of the tapered intermediate portion 82 and which is perpendicular to the direction of extension of the straight runner portion 60. In this embodiment, the single protrusion 90 is provided at a circumferentially central position in the half of the circumference of the inner circumferential surface 85 of the ring-runner-portion forming bush 72, which half and a corresponding half of the circumference of the outer circumferential surface 83 of the tapered intermediate portion 82 define the first region A of the ring runner portion 62. On the other hand, no protrusion is provided in a second region B which is the other half of the circumference of the ring runner portion 62.

Figure 8:
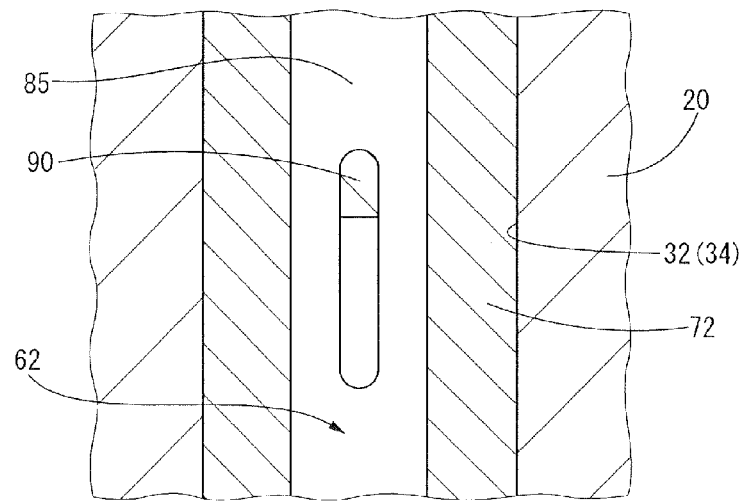
FIG. 8 is a fragmentary enlarged schematic cross sectional view taken along a line VIII-VIII in FIG. 4.

The protrusion 90 has a shape of an ellipse in longitudinal cross section, and a portion of the protrusion 90 has an arcuate end face conforming to the outer circumferential surface 83 of the tapered intermediate portion 82, as shown in FIGS. 4 and 8. The portion of the protrusion 90, which includes the arcuate end face, projects from the inner circumferential surface 85 of the ring-runner-portion forming bush 72 by a height "h" which is substantially equal to a distance "d" between the outer circumferential surface 83 of the tapered intermediate portion 82 and the inner circumferential surface 85 of the ring-runner-portion forming bush 72, namely, a width of the ring runner portion 62. Thus, the arcuate end face of the protrusion 90 is held in contact with the outer circumferential surface 83 of the tapered intermediate portion 82.

The intended molded resin article 10 is produced by using the injection mold 18 having the structure described above, by performing steps described below, for example.

Initially, the movable mold member 22 and the stationary mold member 20 of the injection mold 18 are closed to form the mold cavity 48 therebetween, as shown in FIG. 4.

Figure 9:
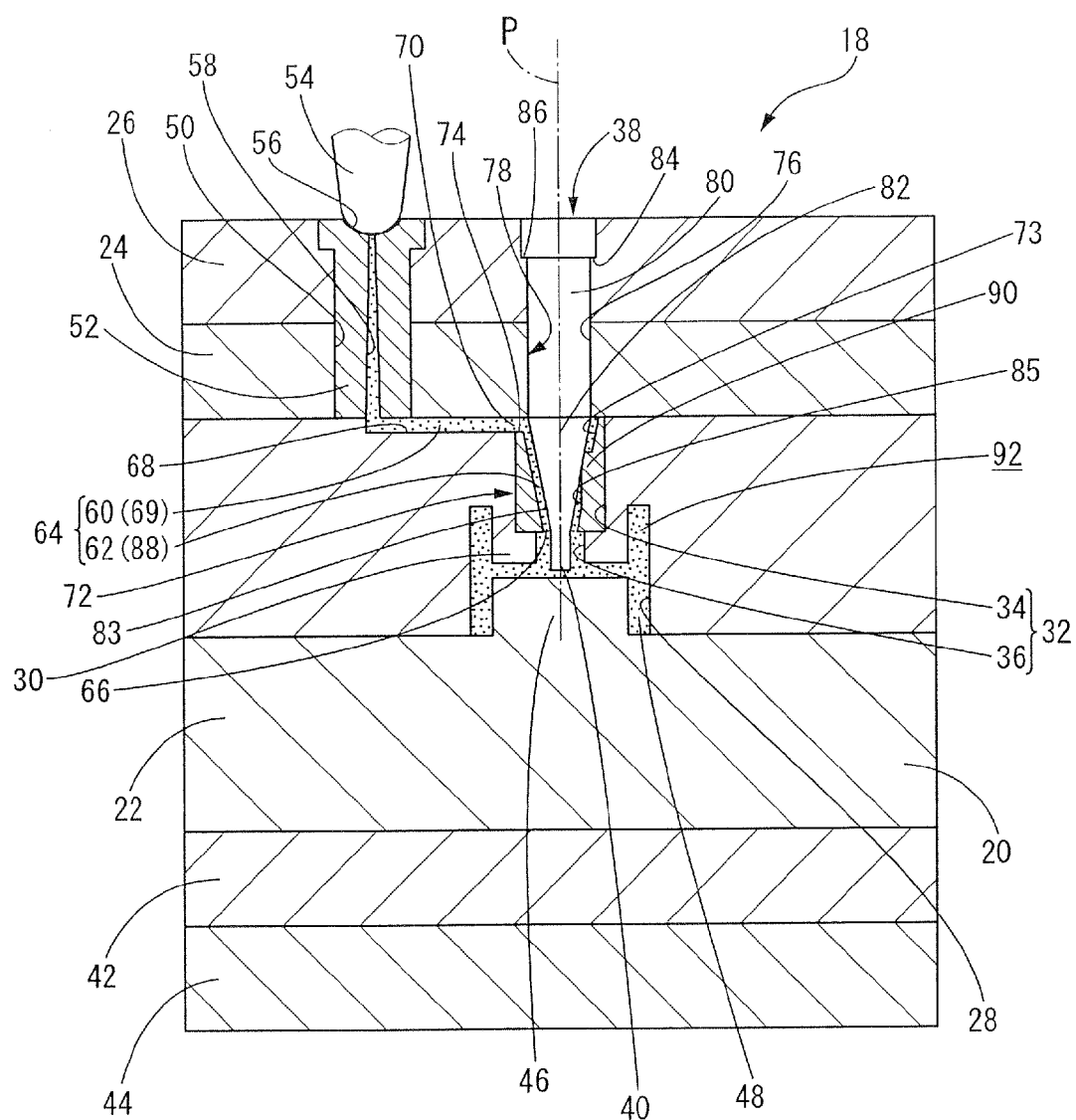
FIG. 9 is a schematic view showing an example of a step of producing the molded resin article shown in FIG. 1 by using the injection mold constructed according to the embodiment shown in FIG. 3.

Then, a molten resin 92 is injected from the nozzle 54 of the injection machine (not shown), whereby the molten resin 92 flows through the sprue 58 into the straight runner portion 60, as shown in FIG. 9. After the molten resin 92 flows through the straight runner portion 60 and through the ring runner portion 62, the molten resin 92 is introduced into the mold cavity 48 through the ring gate 66, whereby the mold cavity 48 is filled with the molten resin 92.

At this time, the molten resin 92 flows into a cylindrical space of the mold cavity 48 corresponding to the inner cylindrical portion 16 of the intended molded resin article 10, over the entirety of an inner circumference of an upper end of the cylindrical space, which upper end corresponds to an upper end face of the inner cylindrical portion 16. After the molten resin 92 flows into the above-indicated cylindrical space of the mold cavity 48 in an axial direction of this cylindrical space, the molten resin 92 further flows into a space of the mold cavity 48 corresponding to the annular partition wall 14, in a radially outward direction from a central part of that space. Then, the molten resin 92 flows into another cylindrical space of the mold cavity 48 corresponding to the outer cylindrical portion 12, in opposite axial directions of this space. Accordingly, it is possible to advantageously prevent fronts of flows of the molten resin 92 from coming together within the mold cavity 48.

At the time when the molten resin 92 horizontally flowing through the straight runner portion 60 toward the ring runner portion 62 is introduced into the ring runner portion 62 through the communication opening 70, and flows through the ring runner portion 62, the outer circumferential surface 83 of the tapered intermediate portion 82 of the core pin 38, which cooperates with the inner circumferential surface 85 of the ring-runner-portion forming bush 72 to define the ring runner portion 62, is pressed away from the communication opening 70 in a direction perpendicular to the axis P of the tapered intermediate portion 82 (core pin 38), due to a pressure of the injected molten resin 92. However, the arcuate end face of the protrusion 90 integrally formed on the inner circumferential surface 85 of the ring-runner-portion forming bush 72 is held in contact with the outer circumferential surface 83 of the tapered intermediate portion 82 at the circumferential position opposite to the communication opening 70 about the axis P. Therefore, even though the tapered intermediate portion 82 has the tapered shape, and even where the molten resin 92 is injected at a high pressure, the tapered intermediate portion 82 can be advantageously prevented from being flexurally deformed in a direction away from the communication opening 70 due to the pressure of the injected molten resin 92 such that a width or volume of the above-described first region A of the ring runner portion 62 becomes smaller than a width or volume of the above-described second region B. Accordingly, when the molten resin 92 downwardly flows through the ring runner portion 62 toward the ring gate 66, it is possible to effectively prevent unevenness of an amount of flow of the molten resin 92 in a circumferential direction of the ring runner portion 62, which unevenness would otherwise cause fronts of flows of the molten resin 92 to come together within the mold cavity 48.

Figure 10:
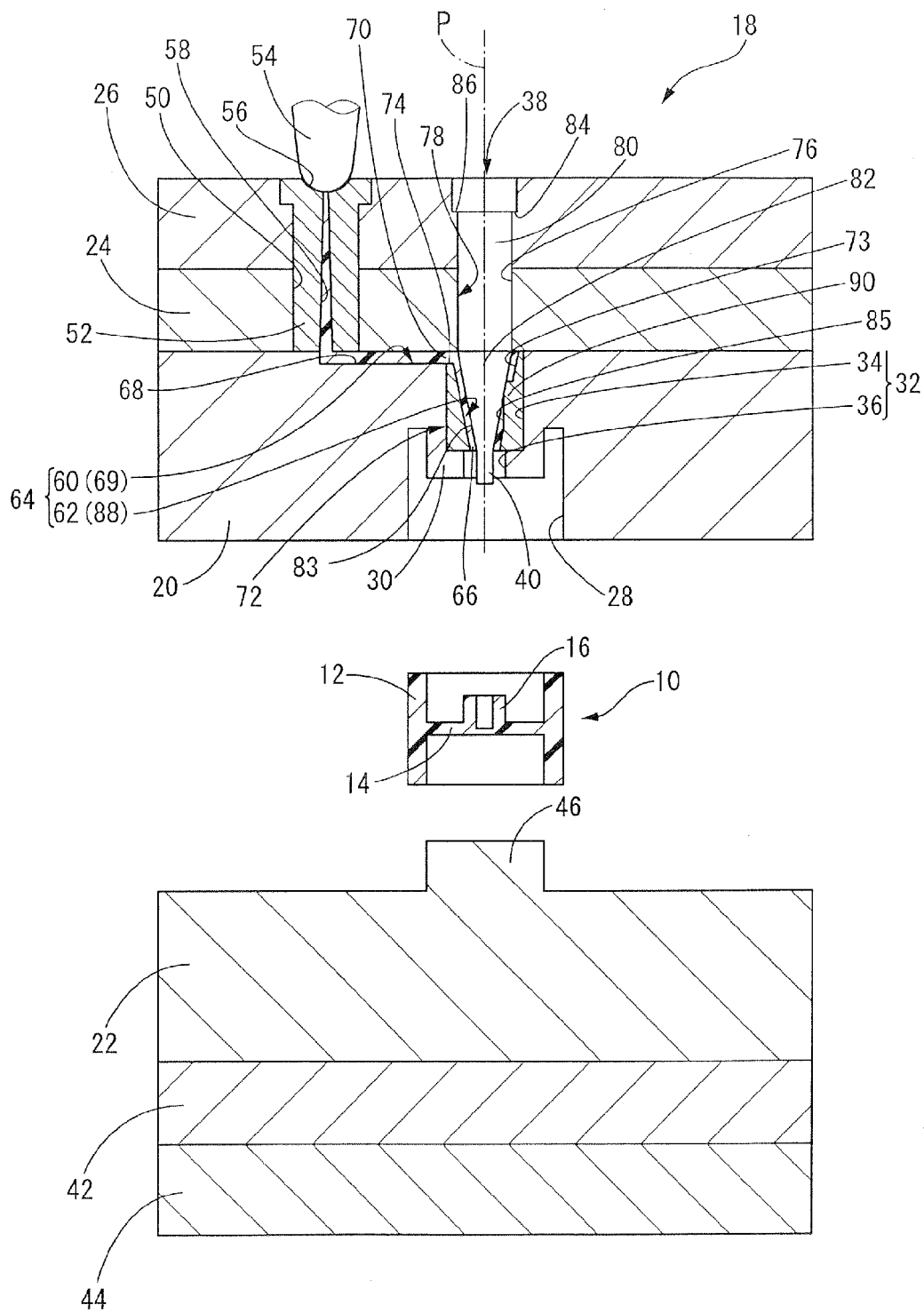
FIG. 10 is a schematic view showing an example of a step following the step shown in FIG. 9.

After the molten resin 92 filling the mold cavity 48 is cooled and solidified, the movable mold member 22 and the stationary mold member 20 are opened, and the solidified molded resin article 10 is removed from the injection mold 18, as shown in FIG. 10. Thus, the intended molded resin article 10 having the structure as shown in FIGS. 1 and 2 is obtained.

As is apparent from the foregoing description, by using the injection mold 18 of this embodiment, it is possible to advantageously prevent the fronts of the flows of the molten resin 92 from coming together within the mold cavity 48. As a result, it is possible to surely produce the molded resin article 10 having an excellent appearance in the absence of a weld line.

The molded resin article 10 produced by using the injection mold 18 of this embodiment is advantageously used as a piston head within a pressure-regulating reservoir used in a vehicular braking system operable to perform an ABS control (anti-skid control), for example. By using the molded resin article 10 produced by using the injection mold 18 of this embodiment, it is possible to highly effectively reduce a weight and a cost of the pressure-regulating reservoir and the braking system, as compared with the case where a conventional metallic piston head is used.

Although the present invention has been specifically described for illustrative purpose only, the present invention is by no means limited to the details of the description.

In the above-described embodiment, the protrusion 90 having the shape of an ellipse in longitudinal cross section is provided in the first region A which is the half of the circumference of the ring runner portion 62, and which is opposite to the other half of the circumference of the ring runner portion 62 adjacent to the straight runner portion 60 (communication opening 70), with respect to the imaginary reference plane a described above. The single protrusion 90 is integrally formed on the inner circumferential surface 85 of the ring-runner-portion forming bush 72, at the circumferential position opposite to the communication opening 70, about the axis P of the tapered intermediate portion 82 of the core pin 38. However, it is possible to suitably change the circumferential position of the inner circumferential surface 85 of the ring-runner-portion forming bush 72 at which the protrusion 90 is formed, and to change the number of the protrusions 90 and the shape of each protrusion 90.

Figure 11:
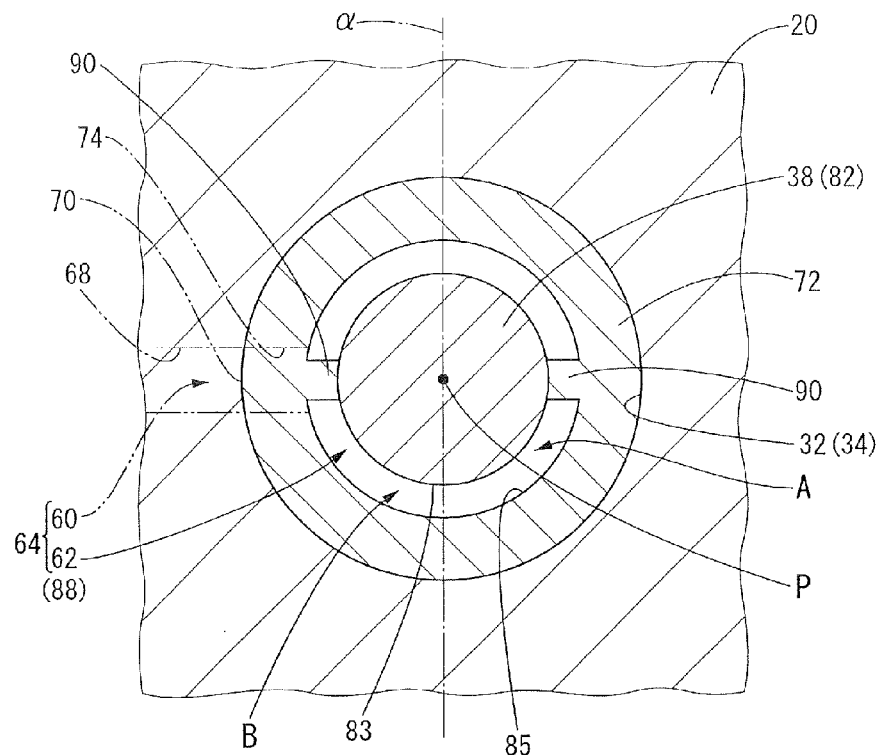
FIG. 11 is a view corresponding to that of FIG. 7 and showing an injection mold having a structure according to another embodiment of the invention.

The protrusion 90 may be provided not only in the first region A, but also in the second region B located on the same side of the imaginary reference plane a as the straight runner portion 60 (communication opening 70), as shown in FIG. 11, for example. Namely, the protrusion 90 may also be provided in the half of the circumference of the inner circumferential surface 85 of the ring-runner-portion forming bush 72, which is located on the same side of the imaginary reference plane a as the communication opening 70. This makes it possible to more effectively prevent the flexural deformation of the tapered intermediate portion 82 due to the pressure of the injected molten resin 92 flowing into the ring runner portion 62.

In either case where the protrusion 90 is formed on the inner circumferential surface 85 of the ring-runner-portion forming bush 72 located in the first region A only, or in both of the first and second regions A and B, one protrusion 90 or a plurality of protrusions 90 may be provided in each of the first and second regions A and B. In this respect, it is preferable that three protrusions 90 are formed on the inner circumferential surface 85 of the ring-runner-portion forming bush 72, at three respective circumferential positions which are equally spaced apart from each other in the circumferential direction of the ring-runner-portion forming bush 72. This makes it possible to further effectively and surely prevent the flexural deformation of the tapered intermediate portion 82 due to the pressure of the injected molten resin 92 flowing into the ring runner portion 62, with a minimum number of the protrusions 90.

In the case where the protrusions 90 are integrally formed on the inner circumferential surface 85 of the ring-runner-portion forming bush 72 located in both of the first and second regions A and B, a maximum circumferential length of the protrusion 90 or a sum of the maximum circumferential lengths of the protrusions 90 located in the second region B is preferably larger than that of the protrusion or protrusions 90 located in the first region A, in the circumferential direction of the ring runner portion 62.

Figure 12:
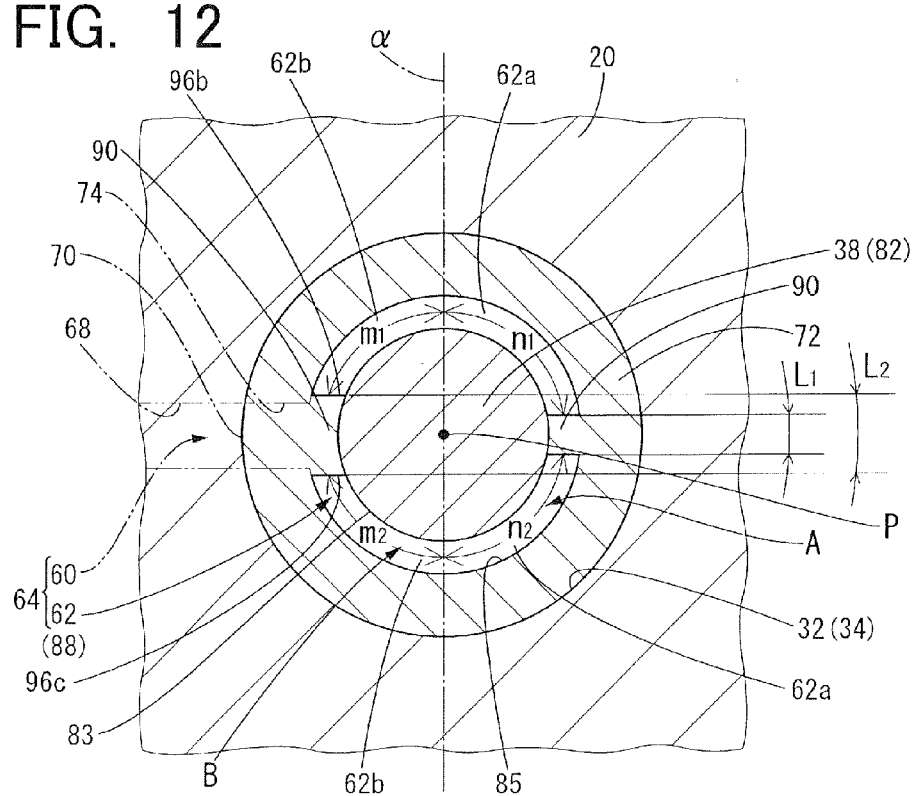
FIG. 12 is a view corresponding to that of FIG. 7 and showing an injection mold having a structure according to a further embodiment of the invention.

Namely, in the case where the single protrusion 90 is provided in each of the first and second regions A and B, as shown in FIG. 12, a maximum circumferential length $L_2$ of the protrusion 90 located in the second region B is preferably larger than a maximum circumferential length $L_1$ of the protrusion 90 located in the first region A. In this case, at an axially intermediate part of the tapered intermediate portion 82, at which the protrusions 90 respectively located in the first and second regions A and B respectively have their maximum circumferential lengths $L_1$ and $L_2$, a total circumferential length ($m_1+m_2$ in FIG. 12) of ring runner portions 62b and 62b constituting the second region B is smaller than a total circumferential length ($n_1+n_2$ in FIG. 12) of ring runner portions 62a and 62a constituting the first region A. Accordingly, a resistance to a flow of the molten resin 92 through the ring runner portions 62b and 62b having the relatively small total circumferential length is larger than a resistance to a flow of the molten resin 92 through the ring runner portions 62a and 62a having the relatively large total circumferential length. Further, an amount of the flow of the molten resin 92 toward the ring gate 66 through the ring runner portions 62b and 62b, which constitute the second region B that is adjacent to the communication opening 70 from which the molten resin 92 is introduced into the ring runner portion 62, and an amount of the flow of the molten resin 92 toward the ring gate 66 through the ring runner portions 62a and 62a, which constitute the first region A that is remote from the communication opening 70, are made substantially equal to each other, so that an even amount of the molten resin 92 advantageously flows through the ring gate 66 into the mold cavity 48, in a circumferential direction of the ring gate 66. As a result, it is possible to more effectively prevent the fronts of the flows of the molten resin 92 from coming together within the mold cavity 48.

Figure 13:
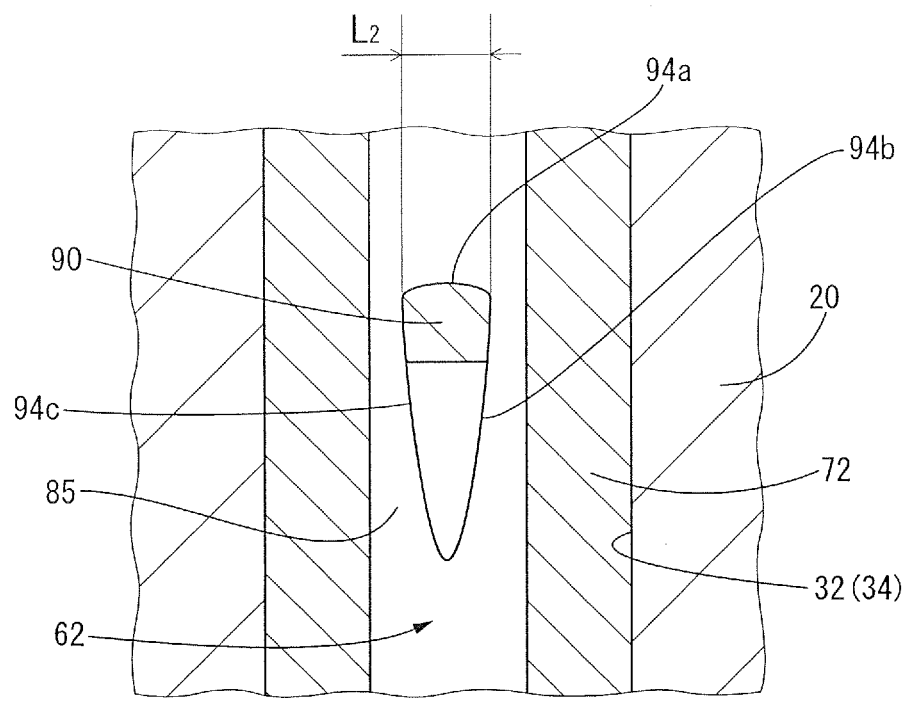
FIG. 13 is a schematic cross sectional view showing the injection mold shown in FIG. 12 and corresponding to that of FIG. 8.

In order to give the protrusion 90 located in the second region B the maximum circumferential length $L_2$ which is larger than the maximum circumferential length $L_1$ of the protrusion 90 located in the first region A, the protrusion 90 located in the second region B is formed so as to have a relatively large dimension in the circumferential direction of the ring-runner-portion forming bush 72 (tapered intermediate portion 82) and a shape of a generally reversed isosceles triangle in a cross section taken in the direction of the axis P of the tapered intermediate portion 82, such that a direction of a height of the isosceles triangle is the direction of the axis P, as shown in FIG. 13, for example. This protrusion 90 includes first, second and third side surfaces 94a, 94b and 94c, which respectively constitute a base and two legs of the isosceles triangle. Among the first through third side surfaces 94a, 94b and 94c, the first side surface 94a giving the base of the isosceles triangle is an upwardly curved or convexed surface located in an upper end of the protrusion 90 and extending in the circumferential direction of the ring-runner-portion forming bush 72. On the other hand, the second and third side surfaces 94b and 94c giving the two legs of the isosceles triangle obliquely vertically extend so as to have a predetermined angle of inclination with respect to the axis P of the tapered intermediate portion 82, and such that a distance between the side surfaces 94b and 94c gradually decreases toward a lower end of the protrusion 90. Accordingly, the circumferential length (width) $L_2$ of the protrusion 90 in the circumferential direction of the inner circumferential surface 85 of the ring-runner-portion forming bush 72, namely, the distance between the second and third side surfaces 94b and 94c gradually decreases toward a lower side of the protrusion 90, on which the ring gate 66 is located.

By forming the protrusion 90 located in the second region B so as to have the above-described shape, the flow of the molten resin 92 downwardly moving through the second region B strikes against the first side surface 94a of the protrusion 90, and is divided into separate flows which move in respective opposite circumferential directions of the ring runner portion 62, and then downwardly move through the ring runner portions 62b and 62b constituting the second region B. Thus, a smooth flow of the molten resin 92 downwardly moving through the second region B is impeded, and a resistance to the flows of the molten resin 92 through the ring runner portions 62b and 62b is effectively increased. On the other hand, after the flow of the molten resin 92 strikes against the first side surface 94a of the protrusion 90 and is divided into the separate flows moving in the respective opposite circumferential directions of the ring runner portion 62, the separate flows respectively move along the second and third side surfaces 94b and 94c of the protrusion 90 and come together right below the protrusion 90. As a result, it is possible to effectively prevent fronts of the flows of the molten resin 92 from coming together in the vicinity of the ring gate 66 of the ring runner portion 62 or within the mold cavity 48.

Figure 14:
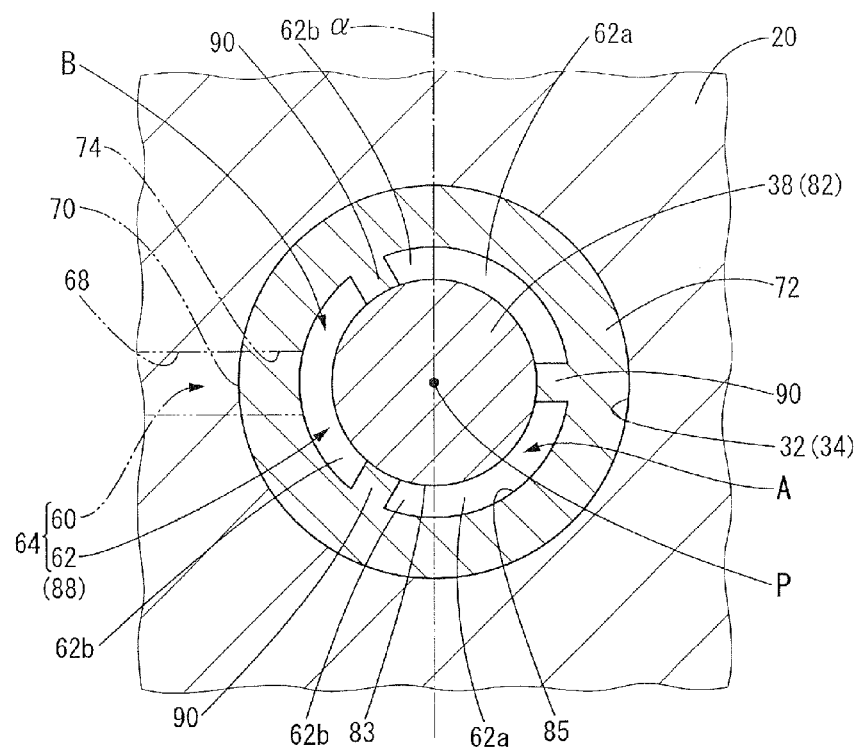
FIG. 14 is a view corresponding to that of FIG. 7 and showing an injection mold having a structure according to a still further embodiment of the invention.

Further, in the case where the protrusions 90 are provided in both of the first and second regions A and B as described above, the number of the protrusions 90 provided in the second region B is advantageously larger than the number of the protrusion or protrusions 90 provided in the first region A. For example, one protrusion 90 is provided in the first region A and two protrusions 90 are provided in the second region B, as shown in FIG. 14. This makes it possible to more effectively prevent the flexural deformation of the tapered intermediate portion 82 due to the pressure of the injected molten resin 92 flowing into the ring runner portion 62. Additionally, a total circumferential length of the ring runner portions 62b, 62b and 62b constituting the second region B is made smaller than a total circumferential length of the ring runner portions 62a and 62a constituting the first region A. As a result, an even amount of the molten resin 92 advantageously flows through the ring gate 66 into the mold cavity 48, in the circumferential direction of the ring gate 66, so that it is possible to advantageously prevent the fronts of the flows of the molten resin 92 from coming together within the mold cavity 48.

Figure 15:
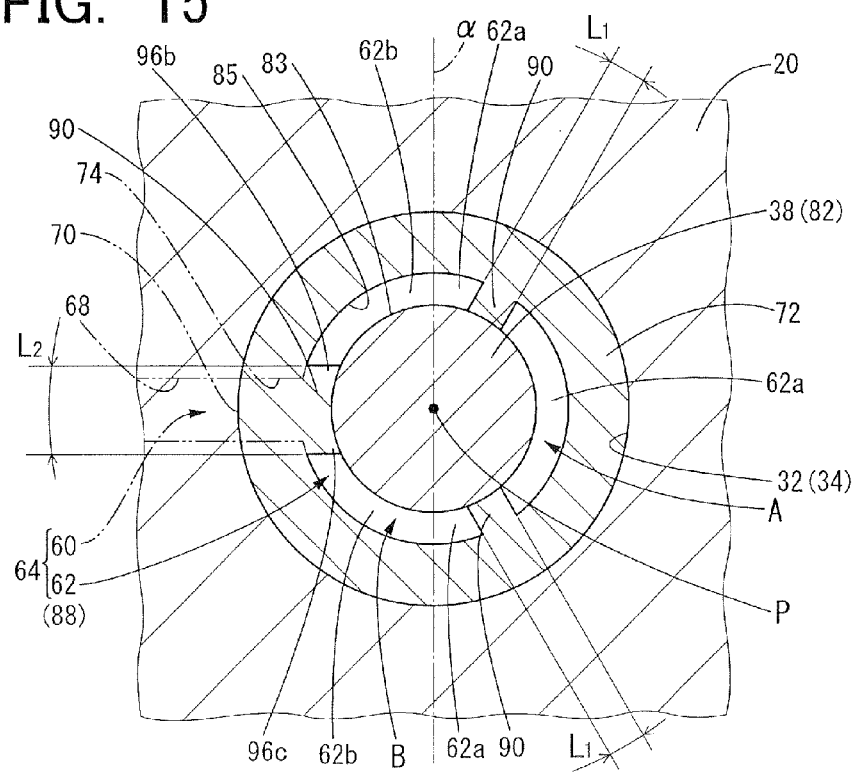
FIG. 15 is a view corresponding to that of FIG. 7 and showing an injection mold having a structure according to a yet further embodiment of the invention.

It is possible to provide one protrusion 90 in the second region B, while providing two protrusions 90 in the first region A, as shown in FIG. 15. In this case, the maximum circumferential length $L_2$ of the protrusion 90 located in the second region B is preferably larger than a sum of the maximum circumferential lengths $L_1$ of the two protrusions 90 and 90 located in the first region A. As a result, an even amount of the molten resin 92 advantageously flows through the ring gate 66 into the mold cavity 48, in the circumferential direction of the ring gate 66, so that it is possible to advantageously prevent the fronts of the flows of the molten resin 92 from coming together within the mold cavity 48. In this case, the protrusion 90 located in the second region B preferably has the same shape in cross section taken in the direction of the axis P of the tapered intermediate portion 82, as shown in FIG. 13.

The protrusion 90 is not necessarily integrally formed on the inner circumferential surface 85 of the ring-runner-portion forming bush 72. The protrusion 90 may be integrally formed on the outer circumferential surface 83 of the core pin 38, for example. Further, the protrusion 90 may be formed on both of the outer circumferential surface 83 of the core pin 38 and the inner circumferential surface 85 of the ring-runner-portion forming bush 72. Moreover, the protrusion 90 may be formed independently of the core pin 38 and the ring-runner-portion forming bush 72. For example, the protrusion 90 may be formed on an outer circumferential surface or an inner circumferential surface of a ring member which is formed independently of the core pin 38 and the ring-runner-portion forming bush 72, and which is fitted on the core pin 38 or within the ring-runner-portion forming bush 72, whereby the protrusion 90 is disposed within the ring runner portion 62.

It goes without saying that the protrusion 90 does not necessarily have the arcuate end face conforming to the inner circumferential surface 85 of the ring-runner-portion forming bush 72 or the outer circumferential surface 83 of the core pin 38.

Depending on the shape of the intended molded resin article 10, the ring runner portion 62 may take the form of a cylindrical space, rather than the tapered cylindrical space.

In the illustrated embodiments, the ring-runner-portion forming bush 72 and the core pin 38 define the ring runner portion 62. However, the ring-runner-portion forming bush 72 may be omitted. In this case, the stationary mold member 20 which has the first through hole 32 in the illustrated embodiments is modified so as to cooperate with the core pin 38 to define the ring runner portion 62.

While some embodiments of the injection mold 18 have been described, the molded resin article 10 may be produced by using a known injection mold as long as the injection mold includes the straight runner portion 60, the ring runner portion 62 and the ring gate 66, and by performing an injection molding operation in a state where the protrusion 90 is located in the first region A of the ring runner portion 62.

In the above-described embodiments of the present invention, specific examples of the injection mold are used for production of the molded resin article including cylindrical portions. However, the molded resin article to be produced by the injection mold according to the invention may have various other shapes. For example, the molded resin article may include a deep hole portion. The present invention also covers a method of producing such a molded resin article.

It is to be understood that the present invention may be embodied with various other changes, modifications and improvements, which are not illustrated herein and which may occur to those skilled in the art, without departing from the spirit of the invention, and that such changes, modifications and improvements are also within the scope of the invention.

The invention claimed is:

1. An injection mold having a cavity for forming a molded resin article, a runner for introducing a molten resin injected from an injection machine into the cavity, and a gate for communication between the runner and the cavity, wherein the runner has: a first communication hole which extends toward the cavity and one of opposite ends of which communicates with the gate; and a second communication hole which communicates with the other end of the first communication hole remote from the gate, and which extends in a direction perpendicular to the direction of extension of the first communication hole, and a pin member is disposed within the first communication hole so as to be spaced apart from an inner circumferential surface of the first communication hole and to extend coaxially with the first communication hole, and such that a distal end portion of the pin member extends through the gate, whereby a ring runner portion is defined by a cylindrical space between the inner circumferential surface of the first communication hole and an outer circumferential surface of the pin member, which surfaces are opposed to each other, and the gate takes the form of an annular ring gate, the injection mold being characterized in that:

at least one protrusion is provided in a first region of the ring runner portion, which first region is a half of a circumference of the ring runner portion and is opposite to a circumferential position of the ring runner portion, at which the first communication hole and the second communication hole communicate with each other, with respect to the pin member, the at least one protrusion projecting from either one of the inner circumferential surface of the first communication hole and the outer circumferential surface of the pin member, such that an end face of the at least one protrusion is held in contact with the other of the inner circumferential surface of the first communication hole and the outer circumferential surface of the pin member.

2. The injection mold according to claim 1, wherein at least a part of the inner circumferential surface of the first communication hole and at least a part of the outer circumferential surface of the pin member are tapered such that an inside diameter of the first communication hole and an outside diameter of the pin member gradually decrease in an axial direction of the ring runner portion toward the ring gate, whereby the ring runner portion is defined by a tapered cylindrical space whose diameter gradually decreases in its axial direction toward the ring gate.

3. The injection mold according to claim 1, wherein the at least one protrusion is provided at a circumferentially central position in said first region of the ring runner portion.

4. The injection mold according to claim 1, wherein the at least one protrusion is provided in both of said first region of the ring runner portion and a second region of the ring runner portion, which second region is the other half of the circumference of the ring runner portion and includes said circumferential position of the ring runner portion, at which the first communication hole and the second communication hole communicate with each other.

5. The injection mold according to claim 4, wherein a sum of a maximum circumferential length of the at least one protrusion provided in said second region, in a circumferential direction of the ring runner portion, is larger than a sum of a maximum circumferential length of the at least one protrusion provided in said first region, in the circumferential direction of the ring runner portion.

6. The injection mold according to claim 4, wherein a number of the at least one protrusion provided in said second region is larger than a number of the at least one protrusion provided in said first region.

7. The injection mold according to claim 1, wherein the at least one protrusion is configured such that its circumferential length in a circumferential direction of the ring runner portion gradually decreases in an axial direction of the ring runner portion toward the ring gate.

8. The injection mold according to claim 4, wherein the at least one protrusion provided in said second region is configured such that its circumferential length in a circumferential direction of the ring runner portion gradually decreases in an axial direction of the ring runner portion toward the ring gate.

9. The injection mold according to claim 7, wherein the at least one protrusion has a curved side surface located on the side of the second communication hole in the axial direction of the ring runner portion, which side surface extends in the circumferential direction of the ring runner portion and is convexed toward the second communication hole.

10. The injection mold according to claim 8, wherein the at least one protrusion provided in said second region has a curved side surface located on the side of the second communication hole in the axial direction of the ring runner portion, which side surface extends in the circumferential direction of the ring runner portion and is convexed toward the second communication hole.

11. A method of producing a molded resin article by using an injection mold having a cavity for forming the molded resin article, a runner for introducing a molten resin into the cavity, and a gate for communication between the runner and the cavity, wherein the runner has: a first communication hole which extends toward the cavity and one of opposite ends of which communicates with the gate; and a second communication hole which communicates with the other end of the first communication hole remote from the gate, and which extends in a direction perpendicular to the direction of extension of the first communication hole, and a pin member is disposed within the first communication hole so as to be spaced apart from an inner circumferential surface of the first communication hole and to extend coaxially with the first communication hole, and such that a distal end portion of the pin member extends through the gate, whereby a ring runner portion is defined by a cylindrical space between the inner circumferential surface of the first communication hole and an outer circumferential surface of the pin member, which surfaces are opposed to each other, and the gate takes the form of an annular ring gate,
  the molded resin article being produced by an injection molding operation wherein the molten resin is injected from an injection machine and introduced into the cavity through the runner and through the ring gate, to fill the cavity,
  the method being characterized in that:
  at least one protrusion is provided in a first region of the ring runner portion, which first region is a half of a circumference of the ring runner portion and is opposite to a circumferential position of the ring runner portion, at which the first communication hole and the second communication hole communicate with each other, with respect to the pin member,
  the at least one protrusion projecting from either one of the inner circumferential surface of the first communication hole and the outer circumferential surface of the pin member, such that an end face of the at least one protrusion is held in contact with the other of the inner circumferential surface of the first communication hole and the outer circumferential surface of the pin member.

* * * * *